United States Patent [19]

Patten et al.

[11] 4,369,871

[45] Jan. 25, 1983

[54] ELEVATOR CONVEYOR FOR TOMATOES OR THE LIKE

[76] Inventors: Harold B. Patten, 4631 Bay's Rd., Rising Sun, Ohio 43457; Samuel H. Patten, 10721 McCutchionville Pike, Wayne, Ohio 43466

[21] Appl. No.: 226,909

[22] Filed: Jan. 21, 1981

Related U.S. Application Data

[63] Continuation of Ser. No. 46,093, Jun. 6, 1979, abandoned.

[51] Int. Cl.³ .............................................. B65G 41/00
[52] U.S. Cl. ..................................... 198/320; 198/841
[58] Field of Search ............... 198/318, 312, 320, 863, 198/841

[56] References Cited

U.S. PATENT DOCUMENTS 1,950,506  3/1934  McLaughlin ....................... 198/320
2,646,157  7/1953  Belt ..................................... 198/320

Primary Examiner—Andres Kashnikow
Assistant Examiner—Douglas D. Watts
Attorney, Agent, or Firm—Wilson, Fraser, Barker & Clemens

[57] ABSTRACT

An elevator conveyor for tomatoes or other fruits or vegetables, which must be carefully handled to prevent damage. The conveyor has an upwardly inclined main frame, which, at its lower or front end, has a dog leg portion disposed generally parallel to the ground or supporting surface. A rubber covered chain conveyor riding over sprocket wheels extends along the dog leg frame portion and main frame. The dog leg frame portion has a chute and the main frame has upstanding extension plates to confine the articles handled. A subframe having ground engaging wheels supports the main frame and is an articulated structure. A cable and sheave arrangement on the subframe enables, by manual operation, up and down adjustment of the discharge end of the conveyor.

3 Claims, 5 Drawing Figures

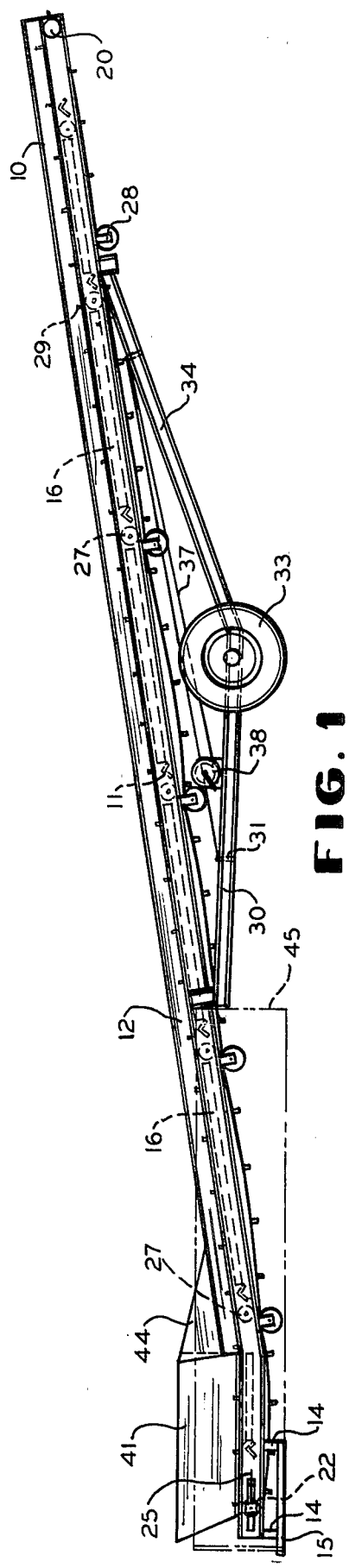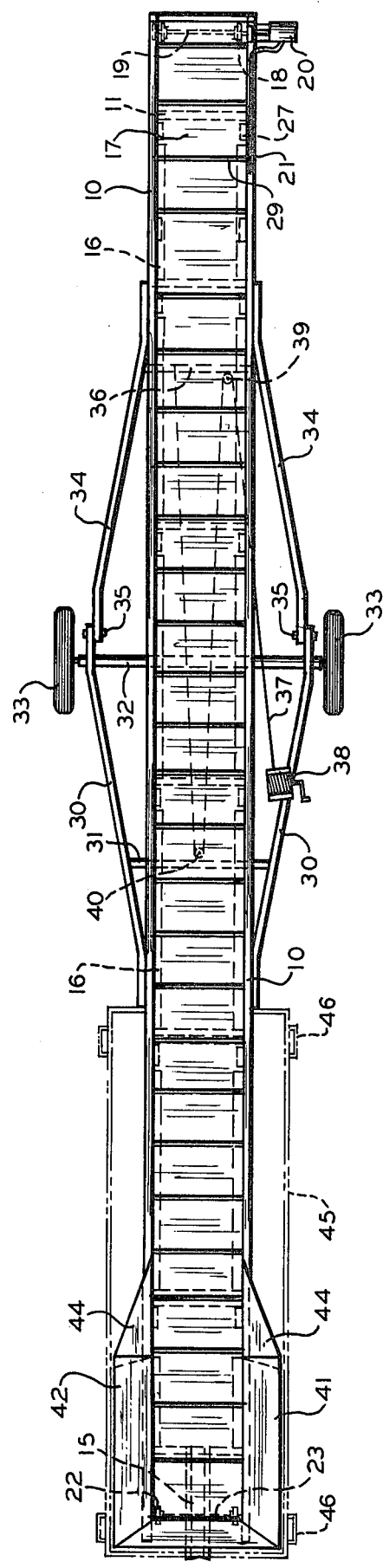

ELEVATOR CONVEYOR FOR TOMATOES OR THE LIKE

This is a continuation, division, of application Ser. No. 046,093 filed June 6, 1979 now abandoned.

BACKGROUND AND OBJECTS OF THE INVENTION

The harvesting of tomatoes is arduous and time-consuming. They are picked by hand from low plants which often are covered by mud and dirt. Not only it is necessary to pick them, but before packaging, they must be washed at least partially, to remove dirt. This is accomplished theretofore by taking a hopper wagon to the field and provided in the wagon is a water circulating pump. Tomatoes, as they are picked, are dumped into the hopper wagon which eventually leaves the field to have its load of tomatoes removed and delivered to a truck for transport to a packing plant, for example. This requires much time and labor and some device is desired to receive tomatoes from the hopper wagon and deliver them efficiently and speedily to an elevated surface such as a truck bed, for example.

An object is to produce a simple and efficient elevator conveyor to which articles, such as tomatoes, can be delivered in quantity and which will convey them to an elevated surface without damage, and to enable the discharge end of the conveyor to be adjusted vertically to the height of the truck bed or surface to which delivery is desired.

Other objects and advantages will appear as description of the preferred embodiment proceeds.

BRIEF DESCRIPTION OF THE DRAWINGS

FIG. 1 is a side elevation of the elevator conveyor showing by broken lines the front end arranged in a water tank;

FIG. 2 is a top plan view of the elevator conveyor shown in FIG. 1;

DESCRIPTION OF PREFERRED EMBODIMENT

Figure 3:
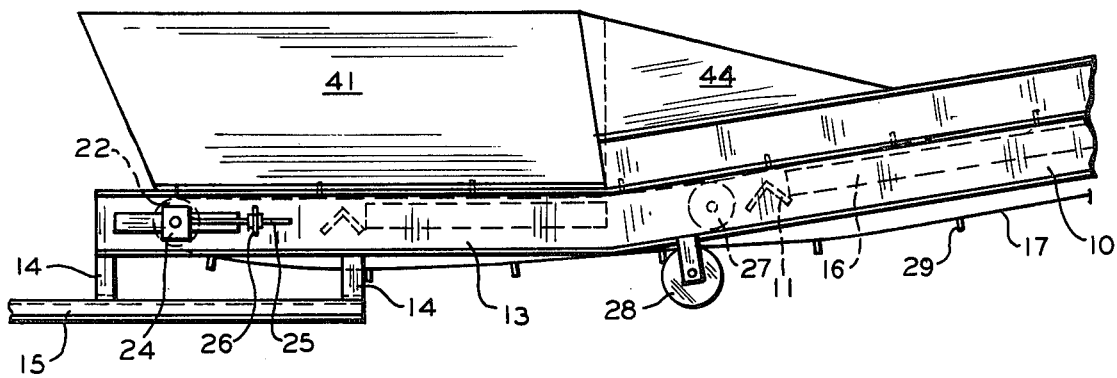
FIG. 3 is a fragmentary enlarged side elevation of the front end portion of the elevator conveyor.
Figure 4:
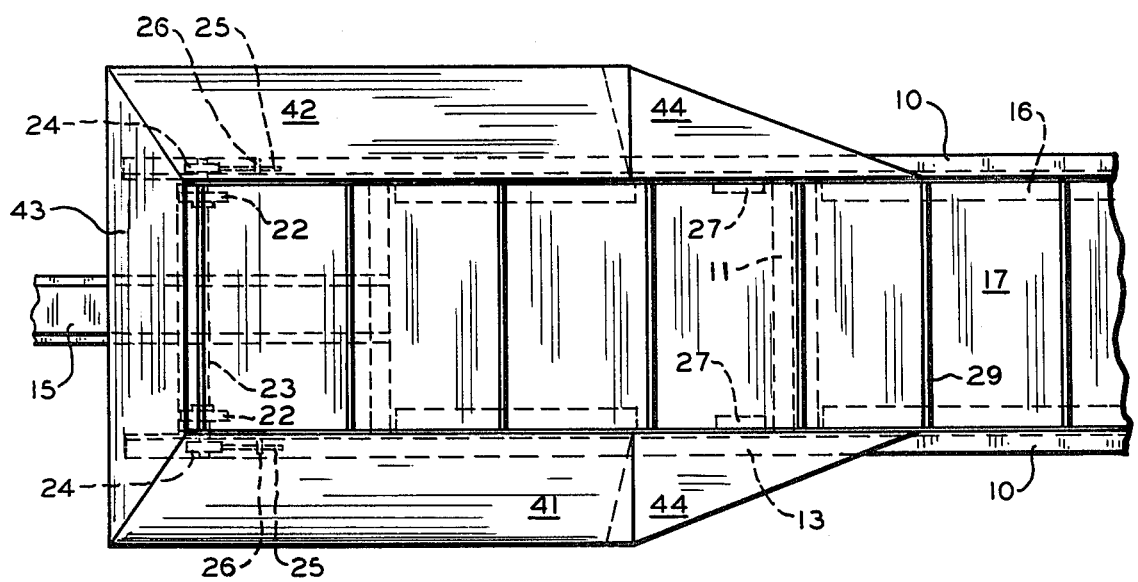
FIG. 4 is a top plan view of the structure shown in FIG. 3.
Figure 5:
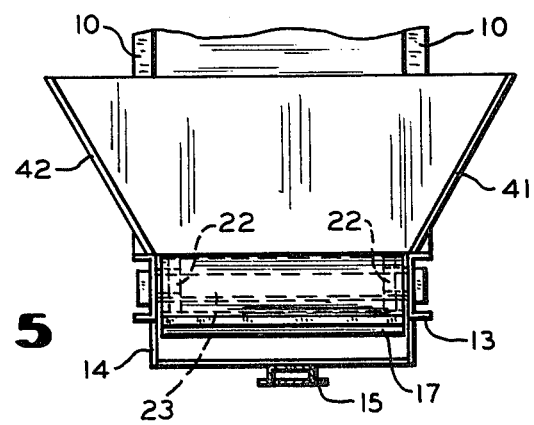
FIG. 5 is a front end elevation of the structure shown in FIGS. 3 and 4.

Referring to the drawings, the elevator conveyor has a main frame provided with a pair of laterally spaced parallel, inwardly facing and upwardly inclined channel beams 10, which are rigidly connected by a series of transverse angle bars 11. Projecting above each of the beams 10 and fixed thereto is a sheet metal extension plate 12, which cooperates to form a guide trough for the articles, such as tomatoes, which are propelled upwardly on the frame. Formed integral with the lower end of the frame and disposed at an angle is a dog leg frame portion 13, which is adapted to lie generally parallel to the ground surface for facilitating delivery of the articles to the frame for conveyance. The dog leg frame portion has depending U-shaped support legs 14, to which is fixed a central, rearwardly extending hitch bar for conveniently connecting to a hauling vehicle.

Fitting in and connected to the inner sides of the channel beams 10 is a series of wooden blocks or planks 16 over which the upper flight of an endless conveyor or chain 17 rides. The conveyor chain 17 is preferably rubber covered and has flexible cross pieces for the articles conveyed. The upper end of the chain 17 engages sprocket wheels 18 carried by a drive shaft 19. An hydraulic motor 20 is carried by the main frame and is operatively connected to drive the shaft 19, suitable hydraulic pipe lines 21 being provided for the motor. At the lower end of the frame, and arranged at the outer end of the dog leg portion, are sprocket wheels 22 for the conveyor chain, a shaft 23 supporting same. A bearing block 24 is provided for each end of the shaft 23, and a screw shaft 25 is attached to each bearing block. A bracket 26 for each screw shaft 25 is secured to the adjacent beam 10, so that turning of the screw shafts 25 in one direction or the other effects loosening or tightening of the conveyor belt, as desired.

For guiding the movement of the conveyor chain 17, a series of rollers 27 is arranged between adjacent ends of the wooden blocks 16. These rollers are disposed substantially in the channels of the beams 10. The lower flight of the conveyor chain rides over rollers 28 carried by brackets secured to the under side of the frame. A series of spaced upstanding rubber pusher paddles 29 forms a part of the conveyor chain for insuring the upper travel of the articles delivered thereto.

A subframe is connected to the under side of the main frame and has a pair of diverging downwardly inclined front arms 30, the front ends being pivoted to brackets depending from the beams 10 respectively. A transverse brace arm 31 is secured at its ends to the arms 30. The rear ends of the arms 30 are parallel to each other and receive an axle 32. Rubber tired wheels 33 on the ends of the axle 32 provides ambulatory support for the main frame. The parallel ends of the arms 30 are pivoted at 35 at the rear side of the axle 32 to the front ends of upwardly inclined converging arms 34. The rear end portions of the arms 34 are generally parallel and are pivoted to the side beams 10 respectively. A cross brace arm 36 rigidly connects the arms 34 adjacent their rear ends.

For causing vertical rocking movements to the rear end of the main frame, a cable 37 has one end wound upon a manually operated reel 38 mounted on a bracket on the subframe. The cable 37 extends rearwardly from the reel and passes over a sheave 39 on the brace arm 36, and then extends forwardly to a sheave 40 on the brace arm 31. The cable then extends rearwardly to the cross brace arm 36, where the end is anchored. By actuating the reel 38 to pull on the cable 37, the main frame is rocked to a limited extent in a counterclockwise direction, thereby to elevate the upper rear end of the frame. By releasing the cable, as by turning the reel in the opposite direction, clockwise frame movement is achieved due to the weight or force of gravity. Thus it will be understood the rear or discharge end of the conveyor can be positioned relative to the bed of a truck, for example for efficient discharge of the load.

The front dog leg portion of the main frame is equipped with an inlet chute, which consists of upstanding outwardly flared sheet metal side walls 41 and 42 and an end wall 43. Wing or gusset walls 44 are joined to the rear edges of the side walls. This enables a large quantity of articles to be dumped into the front or receiving end of the main frame to be carried upwardly by the conveyor.

The entire dog leg portion of the frame in practice is placed in a large tank 45, which is of sufficient depth to extent nearly to the top of the inlet chute. Handles 46 on the sides of the tank are for convenience in transporting.

The elevator conveyor can be readily moved to position of use by connecting the hitch bar 15 to a truck, tractor and the like, the rubber tired wheels 33 enabling easy mobility. Adjusting the discharge end of the conveyor to a truck bed or packing zone provides an important feature of convenience. The device has its receiving end portion admirably adapted to a position for efficiently handling a large quantity, and water introduced into the tank 45 will remove dirt from the tomatoes or other objects to be handled. The structure is simply but sturdily assembled and the endless conveyor traveling over wooden blocks and rollers operates with a minimum of friction. The hydraulic motor drive is practical and reliable and requires little service.

Although a preferred embodiment of the invention has been shown and described, it is to be understood that the above is intended to be illustrative and not limiting. Changes in details of construction and choice of materials are within the purview of the invention.

What is claimed is:

1. Elevator conveyor for tomatoes and the like comprising:
   a. an upwardly inclined main frame having an upper end and a lower end, said main frame including two spaced apart parallel beams connected by a series of spaced apart transverse braces, a plurality of inwardly-extending block means connected to said beams, a series of first rollers rotatably secured to said beams, one of said first rollers being disposed between adjacent ends of said block means, and a series of second rollers secured to an underside of said main frame,
   b. a dog leg lower end frame portion integral with said lower end of said main frame and disposed substantially parallel to the supporting surface,
   c. an endless rubber covered chain conveyor operating throughout said dog leg and main frame, an upper flight of said conveyor chain being carried by said block means and said first rollers and a lower flight of said conveyor chain being carried by said second rollers, said chain conveyor including spaced apart transversely extending cross pieces and upstanding pusher paddles,
   d. a subframe connected to the underside of said main frame having articulated arms and a wheel support axle,
   e. sheave and cable means connected to said articulated arms to cause upon operation variation in vertical positioning of the upper end of said main frame, and
   f. a reel means for operating said cable means.

2. The elevator conveyor defined in claim 1 wherein said lower end frame portion includes an upwardly opening chute including upwardly and outwardly flaring side walls and an end wall for directing articles to said chain conveyor.

3. The elevator conveyor defined in claim 2 including a water tank constructed and arranged to receive said lower end frame portion and said chute.

* * * * *